US012730406B2

(12) United States Patent
Takahashi et al.

(10) Patent No.: US 12,730,406 B2
(45) Date of Patent: Sep. 8, 2026

(54) ELECTRICAL COMPONENT BOX AND IMAGE FORMING APPARATUS

(71) Applicant: CANON KABUSHIKI KAISHA, Tokyo (JP)

(72) Inventors: Yu Takahashi, Kanagawa (JP); Makoto Nishino, Kanagawa (JP); Shoji Sasaki, Kanagawa (JP); Yoshiyuki Beniya, Chiba (JP); Hitoshi Murao, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 18/639,760

(22) Filed: Apr. 18, 2024

(65) Prior Publication Data

US 2024/0364035 A1 Oct. 31, 2024

(30) Foreign Application Priority Data

Apr. 26, 2023 (JP) ................................ 2023-072531
Sep. 27, 2023 (JP) ................................ 2023-166366
Oct. 4, 2023 (JP) ................................ 2023-172593

(51) Int. Cl.

*G03G 21/16* (2006.01)
*G03G 15/00* (2006.01)
*G03G 21/18* (2006.01)
*H01R 13/11* (2006.01)

(52) U.S. Cl.

CPC ......... *G03G 21/1652* (2013.01); *G03G 15/80* (2013.01); *G03G 21/1642* (2013.01); *G03G 21/1647* (2013.01); *G03G 21/1867* (2013.01); *H01R 13/11* (2013.01); *G03G 2221/166* (2013.01)

(58) Field of Classification Search

CPC ............... G03G 15/80; G03G 21/1642; G03G 21/1647; G03G 21/1652; G03G 21/1867; G03G 2221/166; H01R 13/11

See application file for complete search history.

(56) References Cited

U.S. PATENT DOCUMENTS

2015/0063863 A1* 3/2015 Koyanagi ............. G03G 15/80 399/107
2017/0033485 A1* 2/2017 Fukui ..................... H01R 13/04

FOREIGN PATENT DOCUMENTS

JP 2012195277 A 10/2012

* cited by examiner

*Primary Examiner* — Joseph S Wong
(74) *Attorney, Agent, or Firm* — Canon U.S.A., Inc., IP Division

(57) ABSTRACT

A structure includes a first plate-shaped portion having electric conductivity, and a second plate-shaped portion having electric conductivity. The first plate-shaped portion includes an elastic member provided with a bending portion that protrudes toward the second plate-shaped portion and comes into contact with the second plate-shaped portion to establish electrical continuity between the first plate-shaped portion and the second plate-shaped portion. The surface of the bending portion facing the second plate-shaped portion includes a smooth portion and an asperity portion having a roughness that is greater than a roughness of the smooth portion.

22 Claims, 22 Drawing Sheets

ELECTRICAL COMPONENT BOX AND IMAGE FORMING APPARATUS

BACKGROUND

Field

The present disclosure relates to a manufacturing method for a structure, the structure, and a housing.

Description of the Related Art

Contacts between electronic devices, such as personal computers and office machines, need to have reduced electrical resistance values to ensure stable electrical continuity. However, if foreign matter falls on a contact, the foreign matter can interrupt the electrical continuity. To address this issue, Japanese Patent Application Laid-Open No. 2012-195277 discusses a form in which an asperity structure is provided on a contact surface of a contact.

SUMMARY

According to an aspect of the present disclosure, a structure includes a first plate-shaped portion having electric conductivity, and a second plate-shaped portion having electric conductivity, wherein the first plate-shaped portion includes an elastic member provided with a bending portion configured to protrude toward the second plate-shaped portion and come into contact with the second plate-shaped portion to establish electrical continuity between the first plate-shaped portion and the second plate-shaped portion, and wherein a surface of the bending portion facing the second plate-shaped portion includes a smooth portion and an asperity portion having a roughness that is greater than a roughness of the smooth portion.

Further features of the present disclosure will become apparent from the following description of exemplary embodiments with reference to the attached drawings.

DESCRIPTION OF THE EMBODIMENTS

Figure 1:
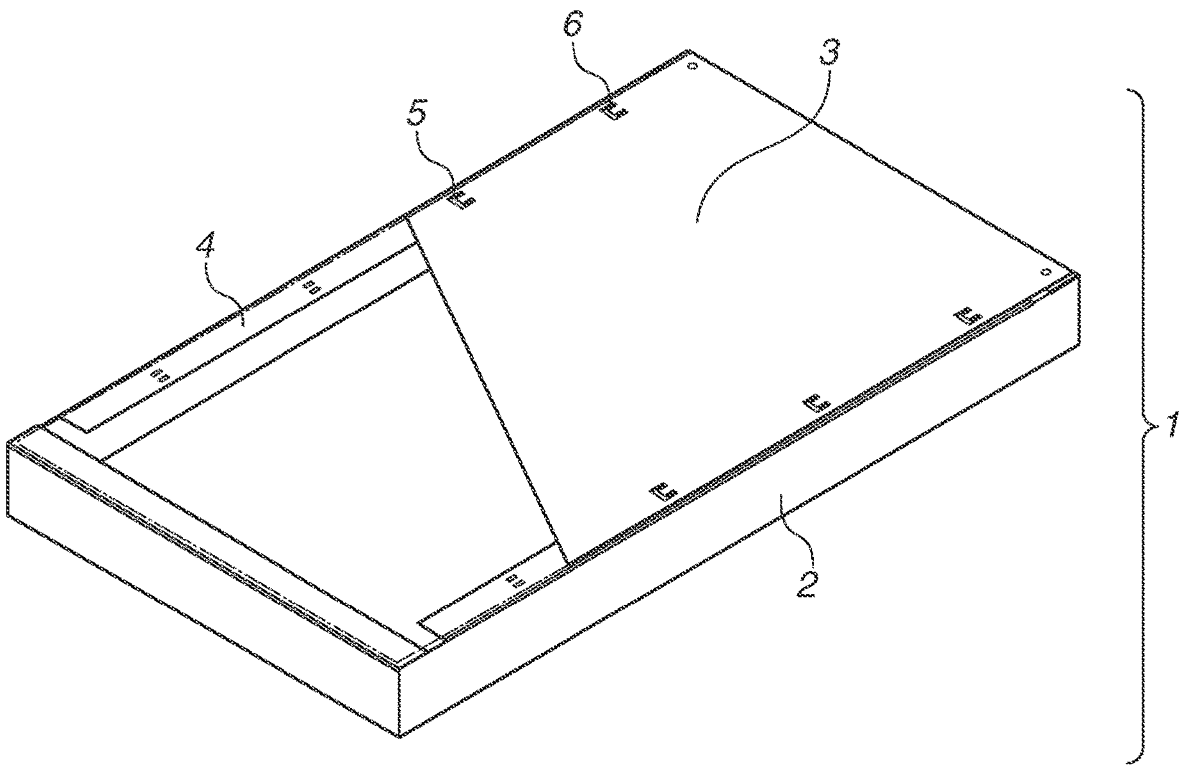
FIG. 1 is a perspective view of a housing forming a structure according to the present disclosure.

Exemplary embodiments of the present disclosure will be described with reference to the attached drawings. The exemplary embodiments described below are merely examples for implementing the present disclosure, and the present disclosure is not limited to them. Common constituent elements will be described with reference to a plurality of drawings, and the descriptions of the constituent elements denoted by common reference numerals will be omitted as appropriate. Different items with the same name can be distinguished by adding an ordinal number, such as the first item and the second item.

FIG. 1 is a perspective view of an exemplary embodiment in which a structure according to the present disclosure is applied to a housing 1 made of a metal plate material. The housing 1 consists of a container 2 molded of a metal plate material and a lid 3 covering an opening of the container 2 as components. The container 2 has an attachment surface 4 formed through a process of bending an edge of the metal plate material. The lid 3 is put on the attachment surface 4 of the container 2 and is fixed, for example, with screws or by welding, at fastening portions 5, forming the housing 1 into a box shape. The housing 1 can be used as a housing for a home electrical appliance and a personal computer, or a control box for a copying machine, a processing machine, and other machines, and an electrical component and a control-related device can be installed or stored in the container 2. In order to prevent static electricity and electromagnetic disturbance from occurring within the housing 1, the container 2 and the lid 3 are each made of an electroconductive material, such as metal. Further, the container 2 and the lid 3 form a structure that ensure the electrical continuity therebetween so that if either the container 2 or the lid 3 is grounded, the other is also grounded.

In the housing 1 according to the present exemplary embodiment, a structure portion 6 disposed at least a part of a plurality of the fastening portions 5 arranged on the attachment surface 4 is configured to establish the electrical continuity between the container 2 and the lid 3. The electroconductive materials forming the container 2 and the lid 3 may be the same material or different from each other.

It is desirable that the material of the metal plate material used of the container 2 and the lid 3 of the housing 1 be an electroconductive member having a low electric resistance value, such as iron or copper. It is desirable that the thickness of the plate material be between 0.4 mm and 1.2 mm. Regarding the material and plate thickness, any electroconductive member that is plastically deformable can be used for the present disclosure. The surface of the electroconductive member is coated with a film, such as zinc plating, in order to maintain a rust preventive property in some cases.

It is desirable that the surface of the metal plate material forming the container 2 and the lid 3 be coated with a film having a lower electric conductivity than that of the electroconductive material of the metal plate material. As this film, it is desirable to use an insulating film made of an insulating material having a high lubricity to prevent a flaw and a fingerprint from remaining thereon and to maintain a favorable appearance. However, it is desirable that the film be not provided on a contact portion in terms of electric conductivity.

Figure 2A:
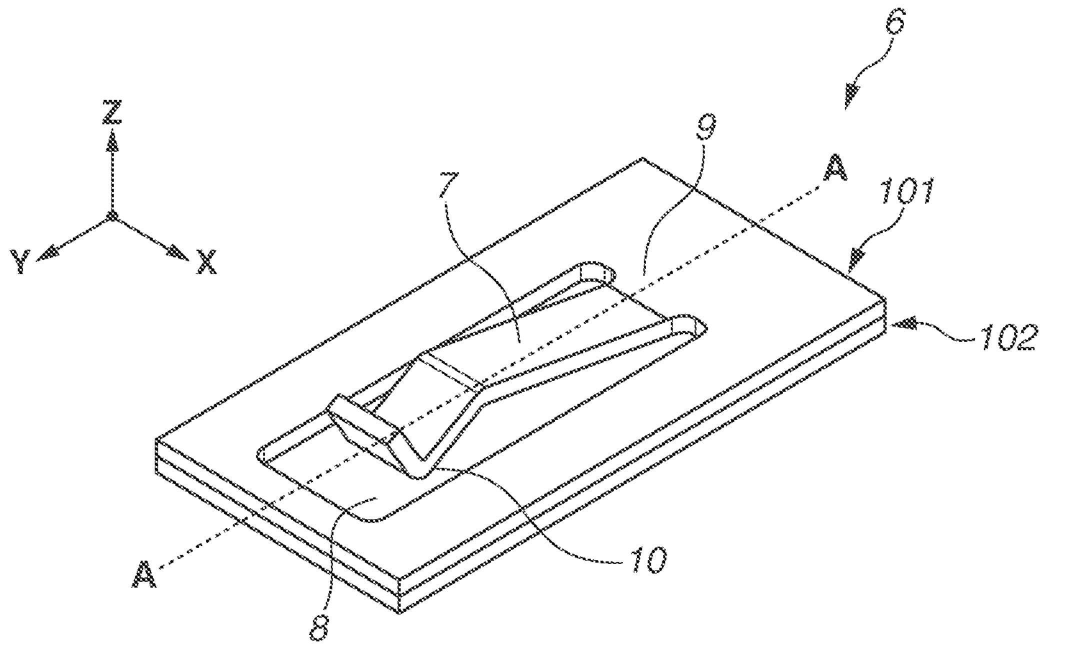
FIG. 2A is a perspective view of a structure portion illustrated in FIG. 1.
Figure 2B:
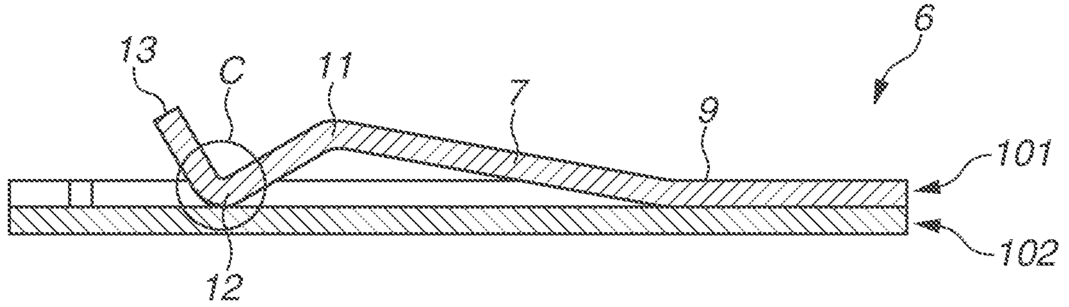
FIG. 2B is a cross-sectional view taken along an A-A line in FIG. 2A.
Figure 3:
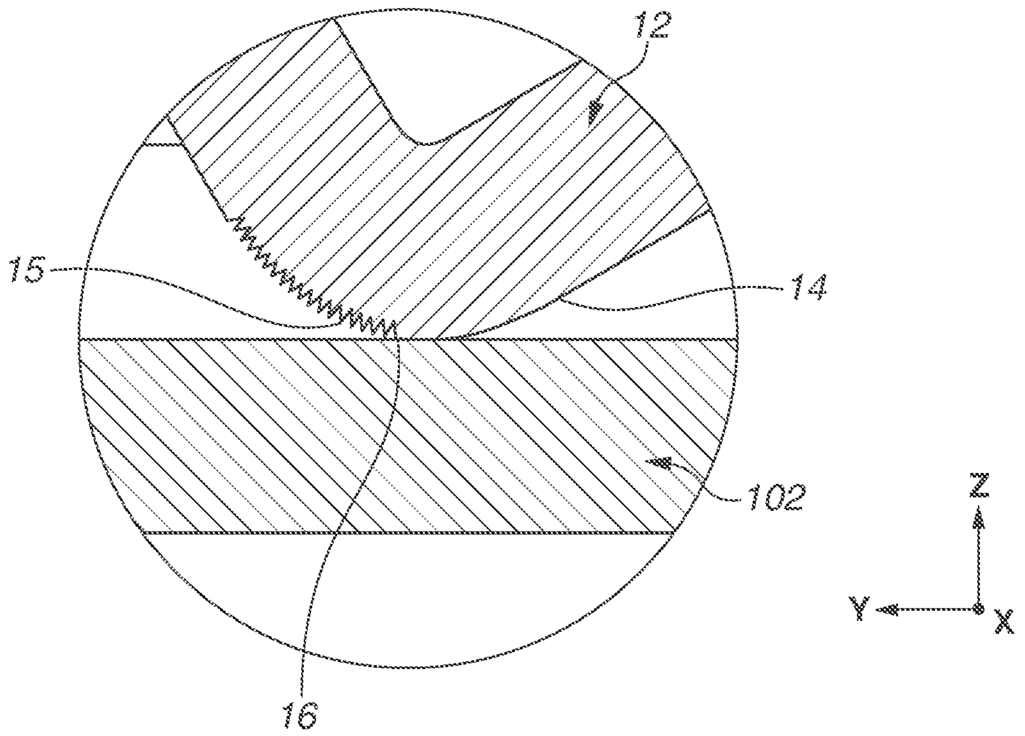
FIG. 3 is an enlarged view of an area surrounded by a circle C in FIG. 2B.

A configuration of a structure portion 6 according to a first exemplary embodiment in FIG. 1 will be described with reference to FIGS. 2A, 2B, and 3. FIG. 2A is an enlarged view of the structure portion 6 in FIG. 1, and FIG. 2B is a cross-sectional view taken along an A-A line in FIG. 2A. FIG. 3 is an enlarged view of the area surrounded by a circle C in FIG. 2B.

The structure portion 6 is a structure of a contact between a first plate-shaped portion 101 and a second plate-shaped portion 102 in which the first plate-shaped portion 101 is provided, for example, on the lid 3, and the plate-shaped portion 102 is provided, for example, on the attachment surface 4 of the container 2. Further, with the lid 3 placed on the attachment surface 4, the plate-shaped portions 101 and 102 overlap with each other.

The first plate-shaped portion 101 includes a movable contact 7 that is provided being surrounded by a fixed contact 8 and extends from a connection portion 9 of the first plate-shaped portion 101. The movable contact 7 and the fixed contact 8 are not provided with an insulating film for protection, and can establish the electrical continuity in contact with each other.

Here, the width direction of the movable contact 7 is an X direction, the direction in which the movable contact 7 extends is a Y direction, and the plate thickness direction is a Z direction. The movable contact 7 is deformable with a force applied thereto, and it is desirable that the thickness of the movable contact 7 be equal to or smaller than the thickness of the first plate-shaped portion 101. It is desirable that the width of the movable contact 7 in the X direction be equal to or smaller than the width of the connection portion 9 and three times or more the thickness of the first plate-shaped portion 101. The width of the connection portion 9 is the width of the first bend point in the direction from the connection portion 9 toward a leading edge portion 13 of the movable contact 7. It is desirable that the width of the movable contact 7 in the X direction gradually narrow toward the leading edge portion 13 and be constant from a certain point. The leading edge portion 13 is an open end so as not to hinder deformation of the movable contact 7.

It is desirable that a bending portion 11 of the movable contact 7 be bent at an obtuse angle. This provides an easy deformation of the bending portion 11 with an applied pressure, the angle of which increases with larger applied pressure. The bending portion 11 can be bent at an acute angle. With the bending portion 11 bent at an acute angle, it is desirable that a smooth portion 14 be closer to the leading edge portion 13 than an asperity portion 15. The arrangement of the smooth portion 14 and the asperity portion 15 may be reversed. Specifically, the smooth portion 14 can be provided closer to the leading edge portion 13, and the asperity portion 15 can be closer to the bending portion 11 (connection portion 9 side). Even in that case, when the asperity portion 15 is brought into contact with the fixed contact 8 and slides thereon, and the smooth portion 14 is brought into contact with the fixed contact 8, the electrical continuity can be established with high certainty. Another bending portion 12 is bent to protrude toward the second plate-shaped portion 102, providing an electrical continuity at the bending portion 12 between the plate-shaped portions 101 and 102. It is desirable that the bending portion 12 have a curvature, and the surface of the bending portion 12 that provides an electrical continuity with the plate-shaped portion 102 has a radius of curvature of 0.3 mm to 1.0 mm, inclusive.

As illustrated in FIG. 3, on the surface of the bending portion 12 facing the second plate-shaped portion 102, the smooth portion 14 and the asperity portion 15 are provided adjacent to each other via a boundary 16. The smooth portion 14 and the asperity portion 15 have a relative relationship with each other. In comparison between their arithmetical mean roughnesses Ra, the greater arithmetical mean roughness Ra can be the roughness of the asperity portion 15, and the smaller arithmetical mean roughness Ra can be the roughness of the smooth portion 14. The arithmetical mean roughness Ra of the smooth portion 14 is, for example, between 0.3 μm and 0.9 μm, inclusive, and the arithmetical mean roughness Ra of the asperity portion 15 is, for example, between 10 μm and 20 μm, inclusive. However, as described above, since the smooth portion 14 and the asperity portion 15 have in the relative relationship with each other, the roughnesses are not limited to the above-described ranges.

It is desirable that the asperity portion 15 have a form in which a plurality of grooves extending in the X direction is formed as illustrated in FIG. 3, but the surface can be also provided with an asperity whose projections and grooves are not aligned, which is formed, for example, by undergoing a blasting process of roughening the surface by projecting particulate abradant. Any configuration can be used as long as foreign matter can be removed at least at the asperity portion 15. The smooth portion 14 refers to a flat surface that is not subjected to any special surface treatment to roughen the surface, and refers to a surface state corresponding to a surface obtained through a rolling or cutting process.

Figure 4C:
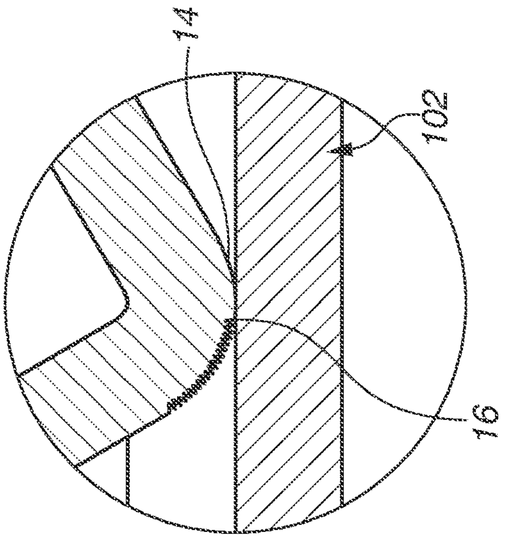
FIGS. 4A to 4C illustrate sliding between a first plate-shaped portion and a second plate-shaped portion.

A method for establishing an electrical continuity between the plate-shaped portions 101 and 102 according to the present exemplary embodiment will now be described with reference to FIGS. 4A to 4C. As the movable contact 7 (the bending portion 12) is lowered to the second plate-shaped portion 102, the movable contact 7 comes into contact with the second plate-shaped portion 102. Because the fixed contact 8 is designed to have a high rigidity, pressing the bending portion 11 downward in the Z direction deforms the movable contact 7. The deformation occurs at the connection portion 9 and the bending portion 11 in directions in which the respective bending angles become larger. The deformation that occurs here is designed to be an amount of deformation within the range of its elastic deformation, so that as the movable contact 7 is separated from the fixed contact 8, the movable contact 7 restores into its original shape.

Figure 4B:
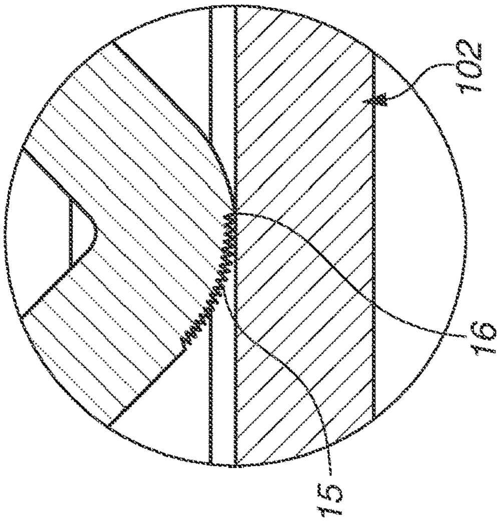
Figure 4A:
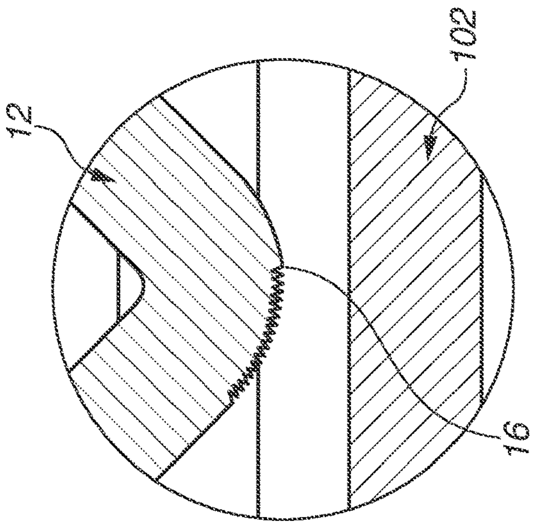

FIG. 4A illustrates a state where the bending portion 12 and the second plate-shaped portion 102 are not in contact with each other, and in this state, the electrical continuity between the plate-shaped portions 101 and 102 is not yet established. As the movable contact 7 (the asperity portion 15) is lowered toward the fixed contact 8 from the state illustrated in FIG. 4A, the movable contact 7 comes into contact with the fixed contact 8 as illustrated in FIG. 4B. Although bringing the asperity portion 15 into contact with the fixed contact 8 makes it possible to establish the electrical continuity, it is difficult to establish the electrical continuity with high certainty due to a small contact area. The movable contact 7 gradually deforms elastically while the movable contact 7 remains in contact with the fixed contact 8. Since the position of the lid 3 on which the movable contact 7 is provided is fixed to the attachment surface 4, the lid 3 however does not move, and the bending portion 12 moves in the Y direction with the angles of the connection portion 9 and the bending portion 11, both of which have low rigidity, being changed.

The deformation of the bending portion 12 generates a rotational moment around the X axis, which rotates the curved surface provided with the asperity portion 15 and the smooth portion 14 about the X direction as the bending portion 12 moves in the Y direction. The rotation also changes the position of the boundary 16, and then the surface of the movable contact 7 that comes into contact with the fixed contact 8 is switched from the asperity portion 15 to the smooth portion 14 as illustrated in FIG. 4C. The smooth portion 14 comes into contact with the fixed contact 8, so that the electrical continuity between the plate-shaped portions 101 and 102 can be established with high certainty.

In the state illustrated in FIG. 4B, the asperity portion 15 comes into contact with and slides on the second plate-shaped portion 102, so that foreign matter, such as dust, on the second plate-shaped portion 102 can be collected in the asperity portion 15.

Contact between the smooth portion 14 and the fixed contact 8 with foreign matter therein can result in an unsuccessful establishment of the electrical continuity. For this reason, after the foreign matter is removed, the state as illustrated in FIG. 4C is reached, which allows a successful establishment of the electrical continuity between the plate-shaped portions 101 and 102 due to no foreign matter between the smooth portion 14 and the fixed contact 8. Even with the bending portion 12 formed only of the asperity portion 15 without the smooth portion 14, foreign matter can be removed. However, the grooves formed in the asperity portion 15 creates a small contact area with the fixed contact 8, which can make the electrical continuity unstable. Here, foreign matter can be a substance that is scraped from the plate-shaped portions 101 and 102 due to abrasion or a substance of a different material from the plate-shaped portions 101 and 102 (foreign matter from outside the housing 1).

The plate-shaped portions 101 and 102 can be overlapped to form the state illustrated in FIG. 4B. Further, the plate-shaped portions 101 and 102 can be overlapped to form the state illustrated in FIG. 4A. In the state illustrated in FIG. 4A, with the plate-shaped portions 101 and 102 overlapped with each other, a pressure is applied to the bending portion 11, reaching the state illustrated in FIG. 4B.

Figure 5C:
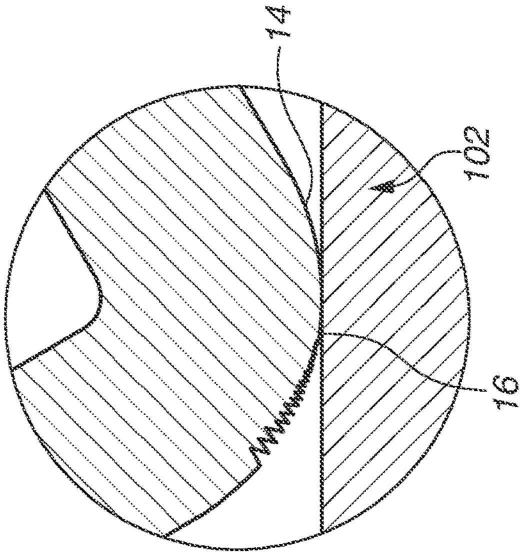
FIGS. 5A to 5C illustrate sliding between the first plate-shaped portion and the second plate-shaped portion.
Figure 5B:
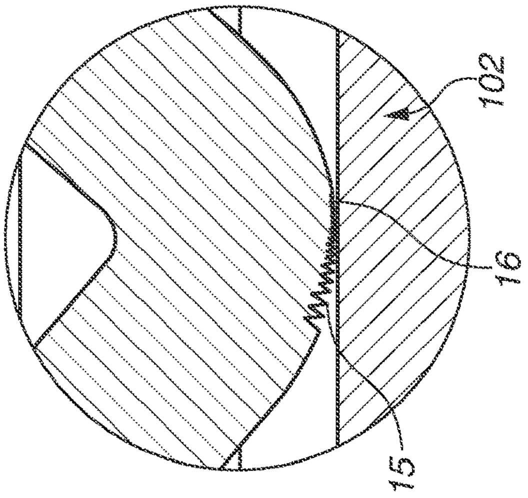
Figure 5A:
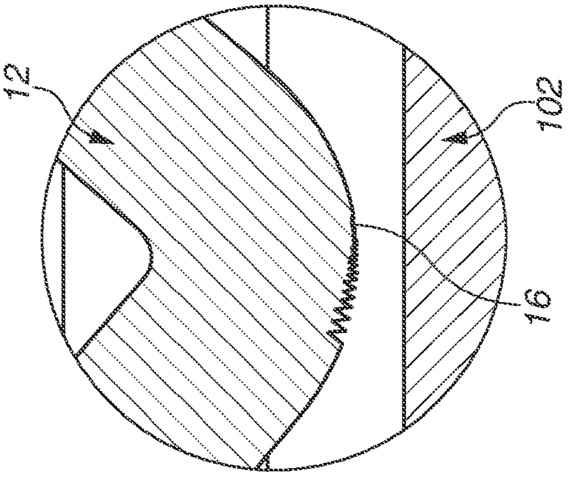

FIG. 5A illustrates a state where the bending portion 12 and the second plate-shaped portion 102 are not in contact with each other. FIG. 5B illustrates a state where the asperity portion 15 and the second plate-shaped portion 102 are in contact with each other. FIG. 5C illustrates a state where the smooth portion 14 and the second plate-shaped portion 102 are in contact with each other.

For example, as illustrated in FIGS. 5A to 5C, a configuration can be used where the arithmetical mean roughness Ra of the asperity portion 15 gradually decreases from the leading edge portion 13 side to the smooth portion 14 side. Specifically, the frictional force against the fixed contact 8 gradually decreases from the leading edge portion 13 side to the smooth portion 14 side. This configuration allows the asperity portion 15 (a first asperity portion) with a greater arithmetical mean roughness Ra to remove foreign matter, and the asperity portion 15 (a second asperity portion) with a smaller arithmetical mean roughness Ra to remove abrasion powder generated at that time. In this case, it is desirable that the arithmetical mean roughness Ra of the asperity portion 15 closer to the leading edge portion 13 be, for example, between 15 μm and 25 μm, inclusive, and the arithmetical mean roughness Ra of the asperity portion 15 closer to the smooth portion 14 be, for example, between 0.5 μm and 1.5 μm, inclusive. It is desirable that the arithmetical mean roughness Ra of the asperity portion 15 closer to the leading edge portion 13 be ten times or more the arithmetical mean roughness Ra of the asperity portion 15 closer to the smooth portion 14.

Figure 6A:
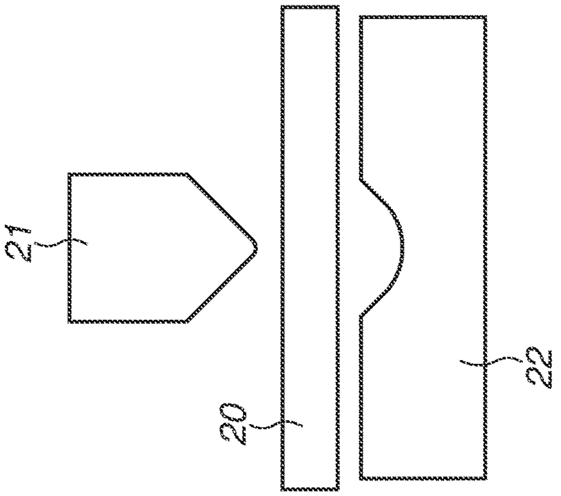
FIGS. 6A to 6C illustrate a method for forming an asperity portion.
Figure 6B:
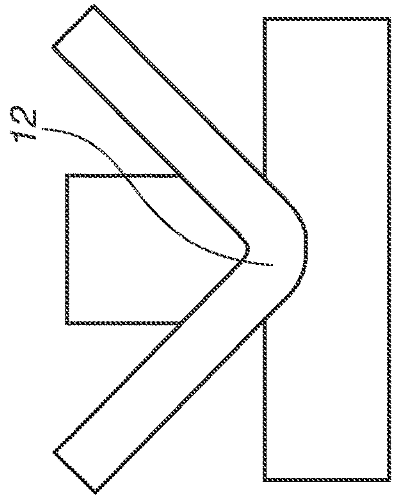
Figure 6C:
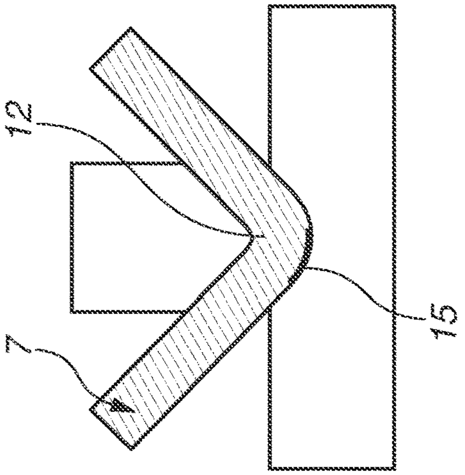

A method for manufacturing the movable contact 7 according to the present exemplary embodiment will now be described with reference to FIGS. 6A to 6C. FIG. 6A illustrates a state of a mold before molding, FIG. 6B illustrates a state of the mold during molding, and FIG. 6C illustrates a main part of the movable contact 7 as a molded product.

The method forms the bending portion 12 by lowering a punch 21 to a metal plate material 20 in which a hole is punched in advance to make the outer shape of the movable contact 7, and sandwiching the metal plate material 20 between the punch 21 and a die 22. In this case, in order to prevent a molding distortion in the metal plate material 20, the bending portion 12 can be formed with a portion of the metal plate material 20 away from the bending portion 12 being held with the mold. The angle of the groove shape in the die 22 is equal to the angle of the bending portion 12 at the leading edge of the movable contact 7. It is desirable that the angle of the inclined surface of the punch 21 be the same as or 1° to 2° smaller than the angle of the groove shape of the die 22. In manufacturing the bending portion 12 by such molding, an asperity shape on the surface in the groove shape of the die 22 is transferred to the metal plate material 20 with the metal plate material 20 sandwiched between the punch 21 and the die 22, as illustrated in FIG. 6C. The asperity portion 15 can be formed through such a mold transfer method, or through a direct process using laser irradiation or blasting.

Figure 7A:
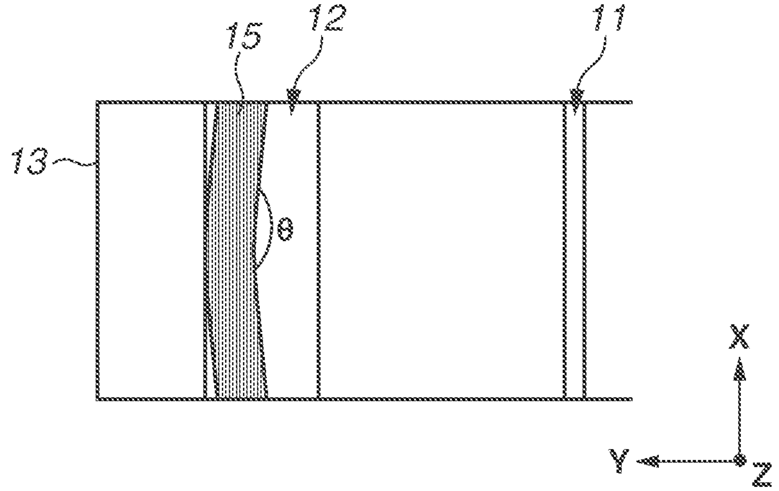
FIGS. 7A and 7B are top views of main parts of a movable contact according to a second exemplary embodiment.
Figure 7B:
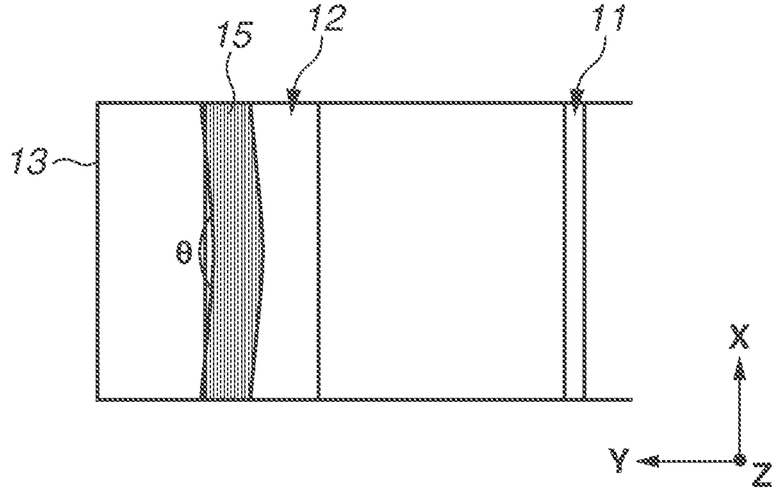

A movable contact 7 according to a second exemplary embodiment will be described with reference to FIGS. 7A and 7B. FIGS. 7A and 7B are top views of a main part of the movable contact 7. The movable contact 7 according to the present exemplary embodiment is different from that according to the first exemplary embodiment in that an asperity portion 15 is not provided linearly in the X direction.

As illustrated in FIGS. 7A and 7B, the center of the asperity portion 15 according to the present exemplary embodiment is provided closer to the leading edge portion 13 or the bending portion 11 (the connection portion 9 side) than both the ends of the movable contact 7 in the X direction. This configuration allows the position where the smooth portion 14 and the fixed contact 8 are in contact with each other to be easily found. With the asperity portion 15 linearly provided as in the first exemplary embodiment, it is difficult to find at which position the smooth portion 14 and the fixed contact 8 are in contact with each other even when the movable contact 7 is viewed from a side. Thus, the asperity portion 15 that is not linearly provided in the X direction as in the present exemplary embodiment allows the contact position to be easily found.

While the V shape in which the asperity portion 15 curves in the Y direction has been described, the asperity portion 15 is not limited to this shape. For example, the asperity portion 15 can form a waved shape. For example, it is desirable that an angle θ of the V shape as illustrated in FIG. 7A or 7B be 100° or more and less than 180°.

Figure 8A:
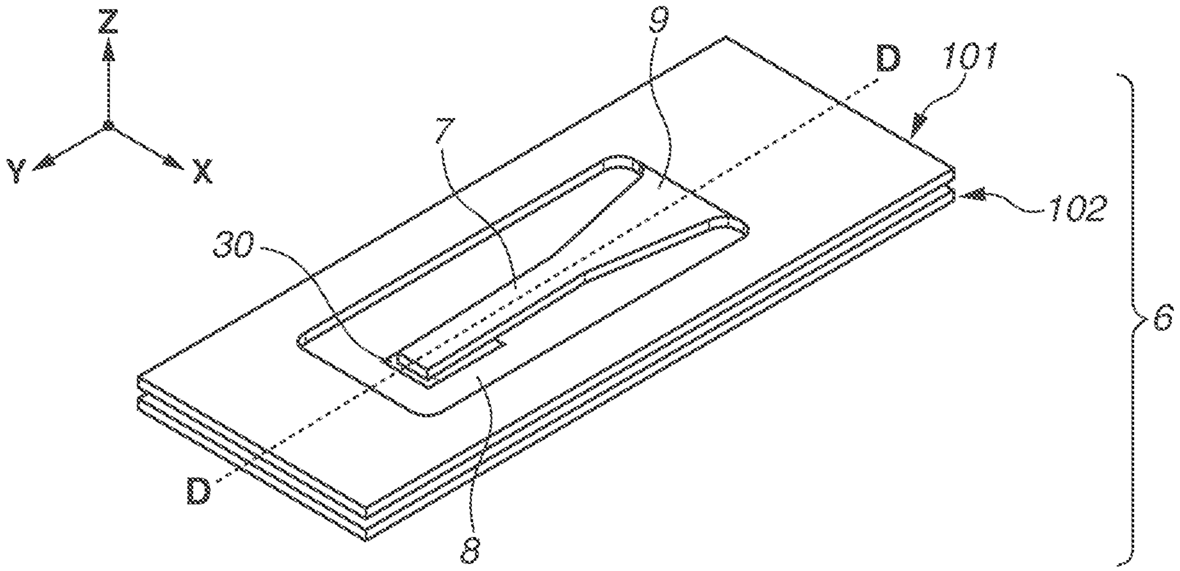
FIG. 8A is a perspective view of the structure portion illustrated in FIG. 1.
Figure 8B:
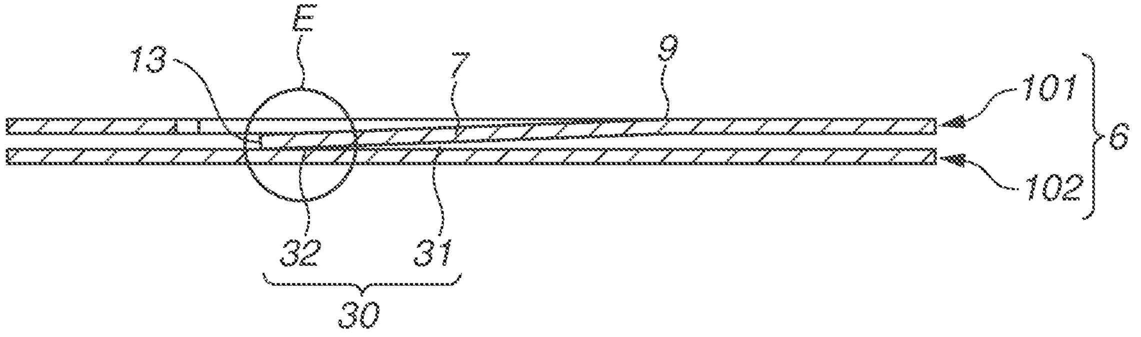
FIG. 8B is a cross-sectional view taken along a D-D line in FIG. 8A.
Figure 9:
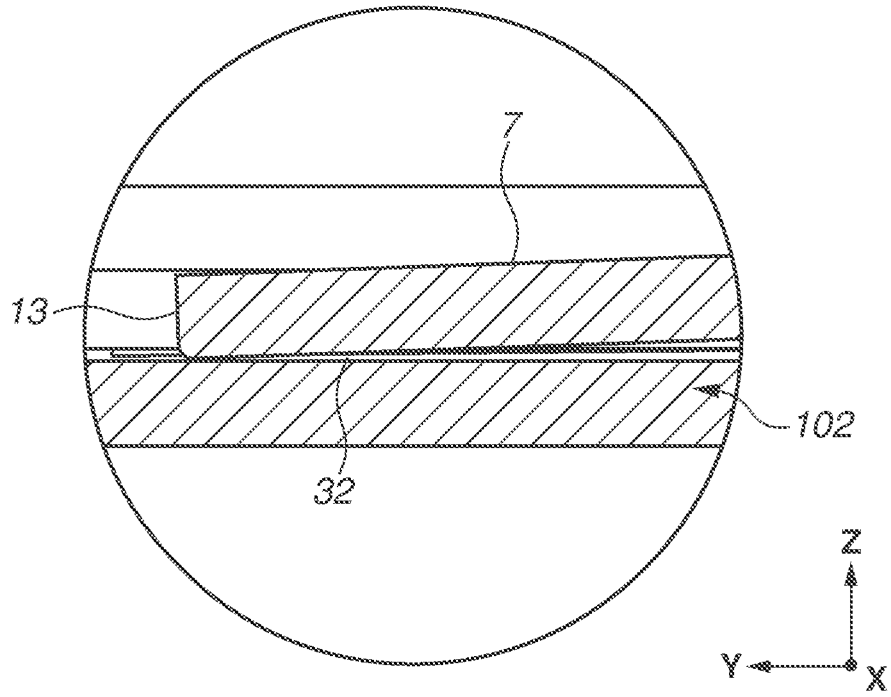
FIG. 9 is an enlarged view of an area surrounded by a circle E in FIG. 8B.

A configuration of a structure portion 6 according to a third exemplary embodiment in FIG. 1 will be described with reference to FIGS. 8A, 8B, and 9. FIG. 8A is an enlarged view of the structure portion 6 in FIG. 1, and FIG. 8B is a cross-sectional view taken along a D-D line in FIG. 8A. FIG. 9 is an enlarged view of the area surrounded by a circle E in FIG. 8B.

The structure portion 6 is a structure of a contact between the plate-shaped portions 101 and 102 in which the first plate-shaped portion 101 is provided, for example, on the lid 3, and the second plate-shaped portion 102 is provided, for example, on the attachment surface 4 of the container 2. Further, with the lid 3 placed on the attachment surface 4, the plate-shaped portions 101 and 102 overlap with each other.

The first plate-shaped portion 101 includes a movable contact 7 that is provided being surrounded by the fixed contact 8 and extends from the connection portion 9 of the first plate-shaped portion 101. Here, the width direction of the movable contact 7 is the X direction, the direction in which the movable contact 7 extends is the Y direction, and the plate thickness direction is the Z direction. The movable contact 7 is deformable with a force applied thereto. It is desirable that the thickness of the movable contact 7 be equal to or smaller than the thickness of the first plate-shaped portion 101.

It is desirable that the width of the movable contact 7 in the X direction be equal to or smaller than the width of the connection portion 9 and three times or more the thickness of the first plate-shaped portion 101. The width of the connection portion 9 is the width of the first bend point in the direction from the connection portion 9 toward the leading edge portion 13 of the movable contact 7. It is desirable that the width of the movable contact 7 in the X direction gradually narrow toward the leading edge portion 13 and be constant from a certain point. The leading edge portion 13 is an open end so as not to hinder deformation of the movable contact 7.

It is desirable that the angle between the connection portion 9 and the movable contact 7 be 45° or smaller. The angle between the connection portion 9 and the movable contact 7 is an angle in the direction in which the movable contact 7 curves upward with respect to the first plate-shaped portion 101. In FIGS. 8A and 8B, the angle between the connection portion 9 and the movable contact 7 is 0°. A higher angle results in a greater amount of movement of the movable contact 7 in the Y direction due to deformation as the first plate-shaped portion 101 is moved in the Z direction with the movable contact 7 of the first plate-shaped portion 101 in contact with the second plate-shaped portion 102. It is desirable that the length of the movable contact 7 extending from the connection portion 9 to the leading edge portion 13 in the Y direction be 20 times or more the plate thickness and be as long as possible. With a longer length of the movable contact 7, the amount of the movement is increased in the Y direction with the movable contact 7 in contact with the second plate-shaped portion 102.

Figure 10A:
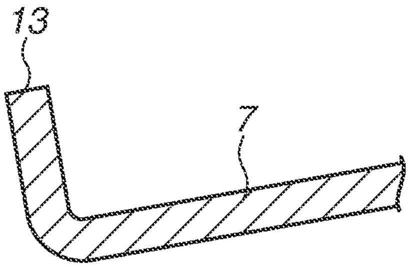
FIGS. 10A to 10C illustrate modifications of an elastic member.
Figure 10B:
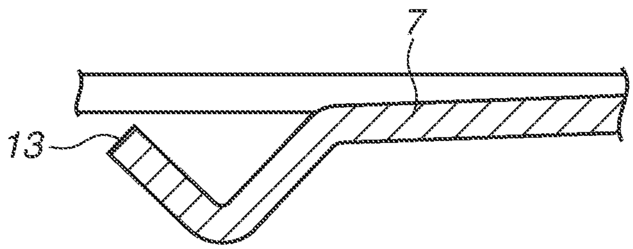
Figure 10C:
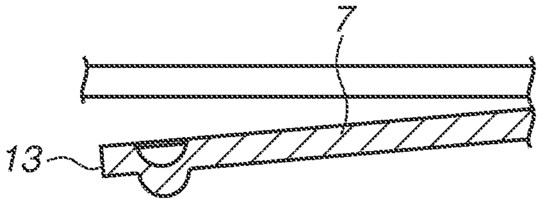

It is desirable that the leading edge portion 13 have a curvature with respect to the second plate-shaped portion 102 and the dimension of the curvature be equal to or smaller than the plate thickness. FIGS. 10A to 10C each illustrate an example of the leading edge shape of the leading edge portion 13 provided with a curvature. FIGS. 10A and 10B each illustrate the leading edge portion 13 of the movable contact 7 having a shape formed by being bent toward the second plate-shaped portion 102. FIG. 10C illustrates the leading edge portion 13 having a convex shape in the second plate-shaped portion 102. The leading edge shapes illustrated in FIGS. 10A to 10C allow the dimension of the curvature to be made equal to or greater than the plate thickness. The leading edge portion 13 has a surface where an electroconductive material is exposed.

As illustrated in FIG. 8B, the surface of the second plate-shaped portion 102 facing the first plate-shaped portion 101 is provided with a coated portion 30 that is coated with a material having a lower friction coefficient than that of the second plate-shaped portion 102. The coated portion 30 includes a molding surface 31 and a molding surface 32, and the molding surface 32 has a low friction coefficient and a lower material thickness than that of the molding surface 31.

The widths of the molding surfaces 31 and 32 are greater than the width of the movable contact 7, and the lengths thereof are longer than the length along which the movable contact 7 moves while being in contact with the second plate-shaped portion 102. The coated portion 30 has a thinner film thickness in the Y direction (the extending direction of the movable contact 7) from the connection portion 9 of the movable contact 7. The thickness of the coated portion 30 ranges, for example, between 2 μm and 3 μm, inclusive, and the thinnest thickness of the coated portion 30 is 50 nm or smaller. However, the above-described film thickness is a value that depends on the external appearance quality required for the second plate-shaped portion 102 and the electrical continuity (resistance value) required for the structure portion 6, and thus the film thickness is not limited to the above-described range.

Figure 11C:
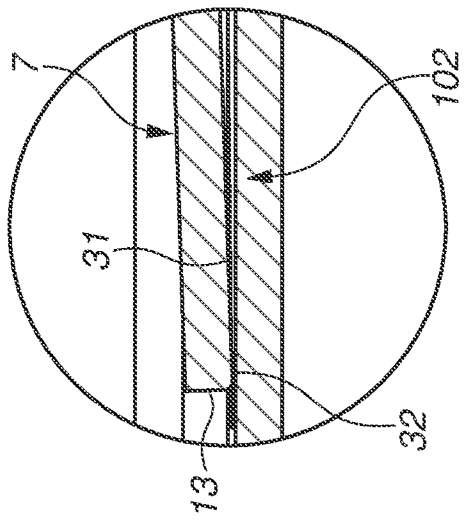
FIGS. 11A to 11C illustrate a method for establishing an electrical continuity between the first plate-shaped portion 101 and the second plate-shaped portion 102.

A method for establishing the electrical continuity between the plate-shaped portions 101 and 102 according to the present exemplary embodiment will now be described with reference to FIGS. 11A to 11C. As the movable contact 7 is lowered to the second plate-shaped portion 102, the movable contact 7 moves in the Y direction, so that the leading edge portion 13 comes into contact with the second plate-shaped portion 102. In this case, because the fixed contact 8 is designed to have a high rigidity, pressing the leading edge portion 13 downward in the Z direction deforms the movable contact 7. The deformation occurs at the connection portion 9 in the direction in which its bending angle becomes larger. The deformation that occurs here is designed to be the amount of deformation within the range of elastic deformation, so that as the movable contact 7 is separated from the fixed contact 8, the movable contact 7 restores into its original shape.

Figure 11B:
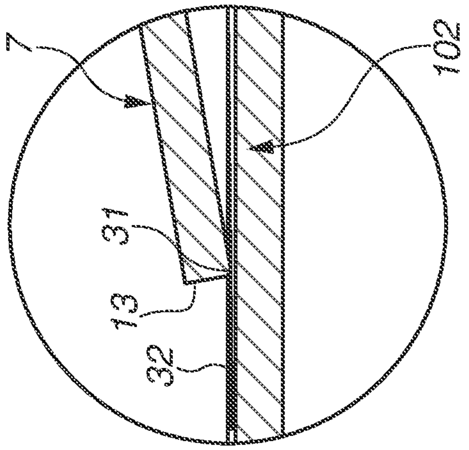
Figure 11A:
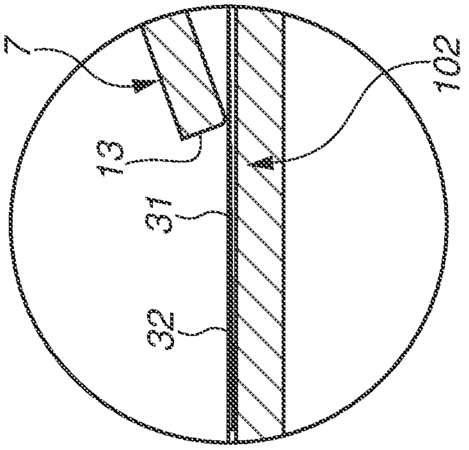

FIG. 11A illustrates a state where the leading edge portion 13 and the second plate-shaped portion 102 are not in contact with each other, and in this state, the electrical continuity between the plate-shaped portions 101 and 102 is not yet established. As the movable contact 7 is lowered to the second plate-shaped portion 102 from the state illustrated in FIG. 11A, the leading edge portion 13 of the movable contact 7 comes into contact with the molding surface 31 as illustrated in FIG. 11B. The movable contact 7 gradually deforms elastically while the movable contact 7 remains in contact with the second plate-shaped portion 102, and the leading edge portion 13 moves in the Y direction as the bending angle of the movable contact 7 changes. As the leading edge portion 13 moves in the Y direction on the molding surface 31, the coated portion 30 has a thinner film thickness that the leading edge portion 13 is in contact with, and finally the leading edge portion 13 comes into contact with the molding surface 32. In FIG. 11C, while the movable contact 7 is gradually deforming as the movable contact 7 remains in contact with the coated portion 30, the contact load on the second plate-shaped portion 102 is increased, which presses the thin coated film as the molding surface 32, making the leading edge portion 13 closer to the second plate-shaped portion 102, allowing establishment of the electrical continuity with high certainty.

In the state illustrated in FIG. 11B, the coated portion 30 has a friction coefficient of 0.05 or smaller due to the film, reducing the frictional force with the leading edge portion 13 being sliding in contact with the coated portion 30. With the leading edge portion 13 in contact with the surface of the second plate-shaped portion 102, the friction coefficient of the second plate-shaped portion 102 is 0.5 or greater, increasing the frictional force between the leading edge portion 13 and the second plate-shaped portion 102. If the surface roughness of the leading edge portion 13 and the second plate-shaped portion 102 is increased due to friction, the contact area between the leading edge portion 13 and the fixed contact 8 is reduced, which can result in an unsuccessful establishment of the electrical continuity. For this reason, the coated portion 30 is present until the location illustrated in FIG. 11C, preventing an increase in the frictional force during the contact between the leading edge portion 13 and the second plate-shaped portion 102, allowing a successful establishment of the electrical continuity without reduction in the contact area.

Figure 12:
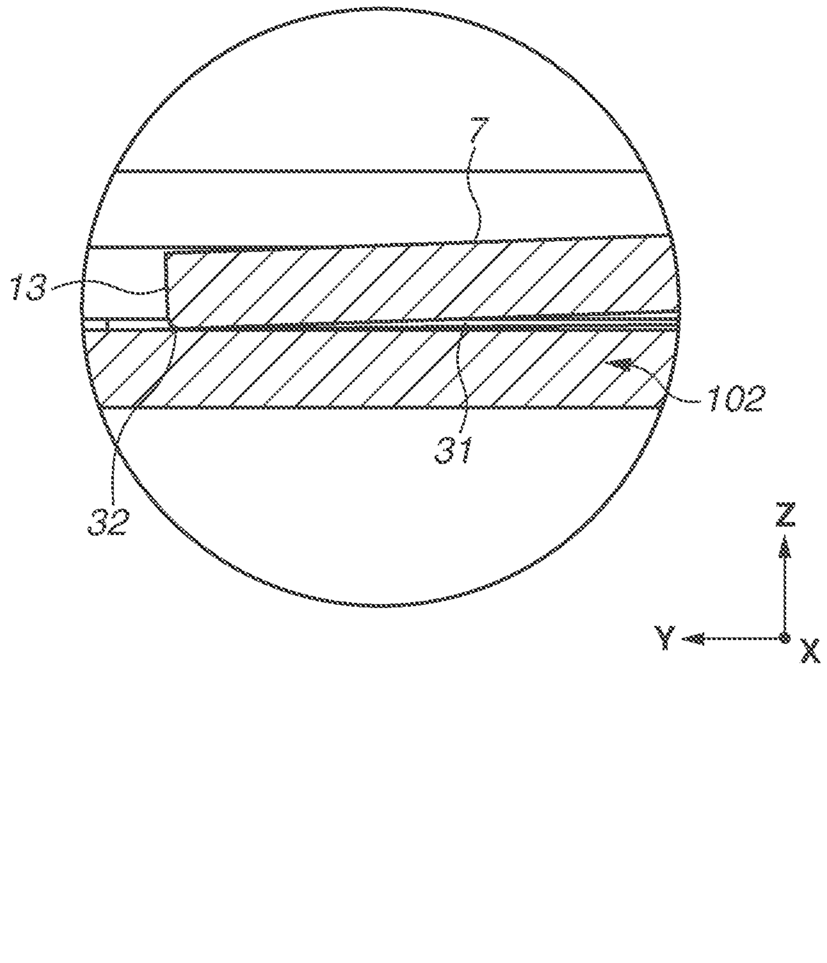
FIG. 12 illustrates the method for establishing an electrical continuity between the first plate-shaped portion and the second plate-shaped portion.

FIG. 12 illustrates another configuration of a contact state between the leading edge portion 13 of the movable contact 7 and the molding surface 32 of the fixed contact 8. At the position where the movement of the movable contact 7 is completed, the film of the molding surface 32 is almost in a zero-state, i.e., the film is absent, so that the electrical continuity between the second plate-shaped portion 102 and the leading edge portion 13 can be established with higher certainty. However, a longer distance for which the leading edge portion 13 slides on the second plate-shaped portion 102 can cause an increased abrasion, reducing the contact area, which can lead to an unstable electrical continuity.

Thus, with the configuration in FIG. 12, the position of the movable contact 7 that slides on the molding surface 32 is defined by the shape adjacent to the structure portion 6 or a jig. The leading edge portion 13 rests on the second plate-shaped portion 102 at the time the contact is established, in other words, the sliding is completed on the molding surface 32 without the film, ensuring the stability of electrical continuity. In this case, only the position where the sliding of the movable contact 7 on the molding surface 31 is completed can be the molding surface 32. Further, the film can have a thinner thickness from the molding surface 31 toward the molding surface 32.

Figure 13A:
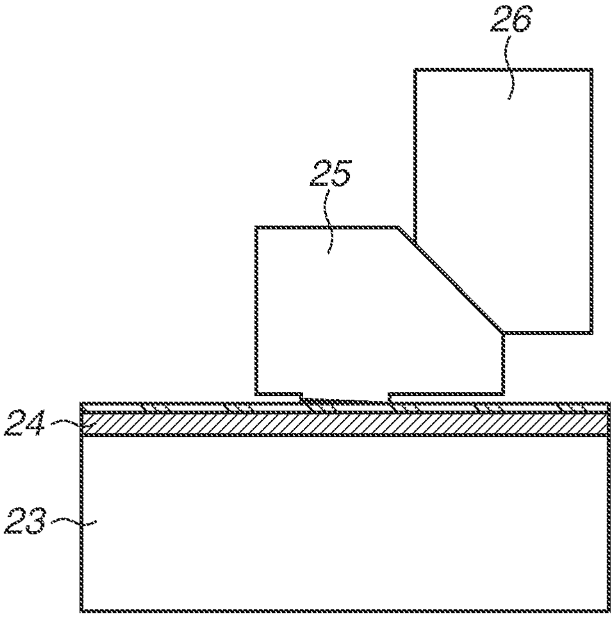
FIGS. 13A and 13B illustrate a modification of the method for establishing an electrical continuity between the first plate-shaped portion and the second plate-shaped portion.

A method for manufacturing the molding surface 32 according to the present exemplary embodiment will now be described with reference to FIGS. 13A and 13B. FIG. 13A illustrates a state of a mold before molding, and FIG. 13B illustrates a state of the mold after molding.

A metal plate material 24 for forming the molding surface 32 is placed on a die 23, and a punch 25 and a cam driver 26 are lowered together onto the metal plate material 24. A film is applied to the surface of the metal plate material 24 facing the punch 25.

Figure 13B:
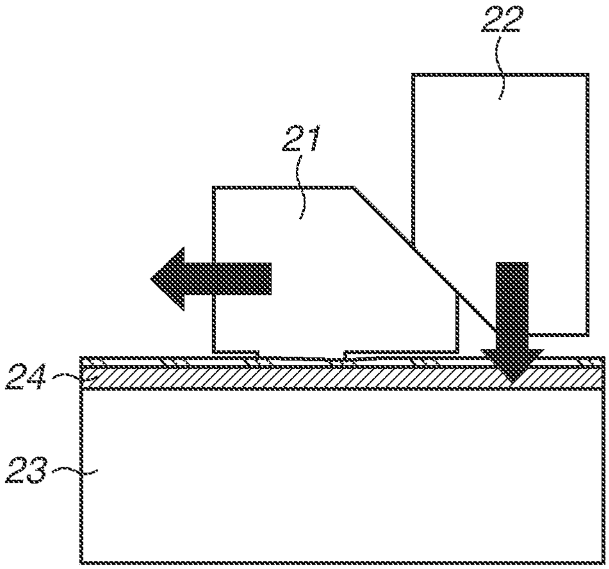

As illustrated in FIG. 13B, with the metal plate material 24 sandwiched between the punch 25 and the die 23, only the cam driver 26 is further lowered. An inclined surface provided on the cam driver 26 is pushed against an inclined surface of the punch 25 that is in contact with the inclined surface of the cam driver 26, moving the punch 25 in a horizontal direction. This causes friction with the contact surface of the punch 25, peeling the film off the surface of the metal plate material 24, forming the molding surface 32.

To adjust the film thickness of the molding surface 32, the surface of the punch 25 in contact with the metal plate material 24 is inclined with respect to the surface on which the punch 25 moves in the horizontal direction. This increases the contact pressure on the metal plate material 24 during the movement of the punch 25, allowing an increase in the amount of peeling the film (the thickness to be peeled off of the film). Changing of the amount of peeling the film allows control of the film thickness of the molding surface 32. The molding surface 32 can be formed through the above-described molding method, or through a direct process using laser irradiation.

Figure 14A:
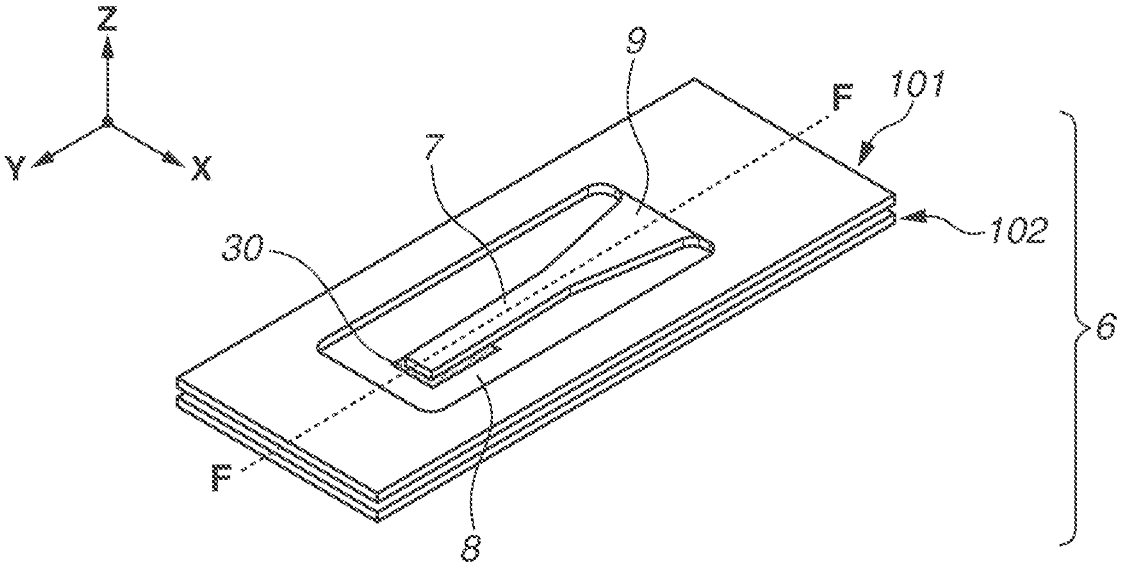
FIGS. 14A and 14B illustrate a method for manufacturing a molding surface.
Figure 14B:
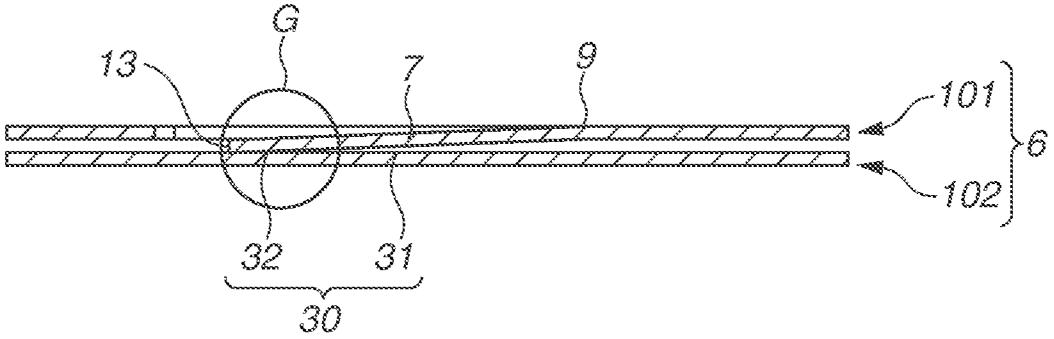
Figure 15:
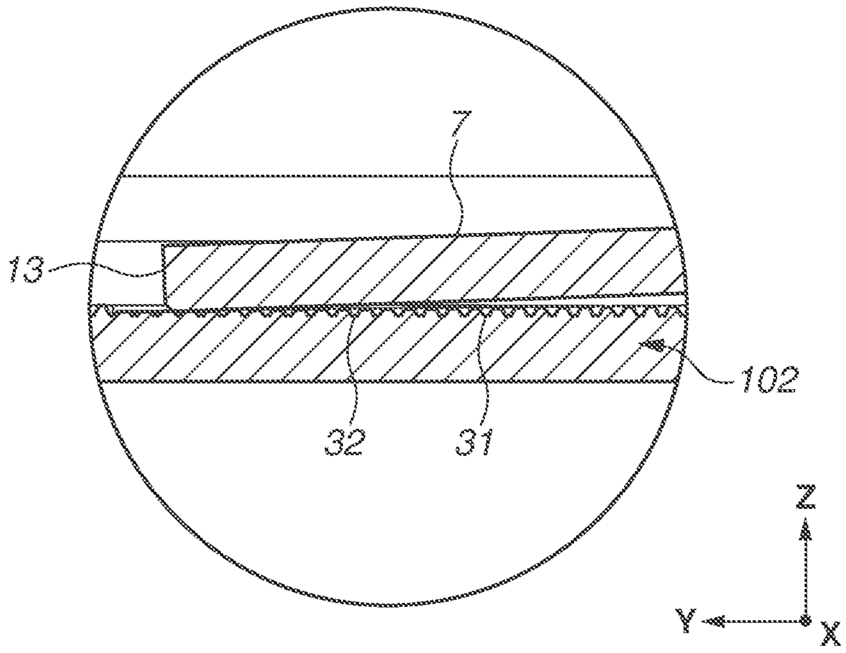
FIG. 15 is an enlarged view of an area surrounded by a circle G in FIG. 14B.

A configuration of a structure portion 6 according to a fourth exemplary embodiment will be described with reference to FIGS. 14A, 14B, and 15. FIG. 14A is an enlarged view of the structure portion 6 according to the present exemplary embodiment, and FIG. 14B is a cross-sectional view taken along an F-F line in FIG. 14A. FIG. 15 is an enlarged view of the area surrounded by a circle G in FIG. 14B.

The structure portion 6 according to the present exemplary embodiment is different from the first exemplary embodiment in that the coated portion 30 and the second plate-shaped portion 102 exposed from the coated portion 30 are arranged alternately in the extending direction of the movable contact 7.

According to the present exemplary embodiment, the ratio of the exposed area of the second plate-shaped portion 102 without the film is increased from 0% to 80% in the direction in which the leading edge portion 13 of the movable contact 7 contacts and slides (the Y direction). Specifically, as illustrated in FIGS. 14B and 15, the film thickness is also gradually reduced in the direction of contacting and sliding according to the present exemplary embodiment.

With the surface of the second plate-shaped portion 102 that is a rough surface, partial projections on the rough surface of the second plate-shaped portion 102 without the coated portion 30 are exposed as the film thickness gradually becomes thinner. It is desirable that the ratio of the exposed second plate-shaped portion 102 that increases in the Y direction of the coated portion 30 be set to a range between 30% and 80%, inclusively. The exposed ratio in the range between 30% and 80%, inclusive, allows the frictional force between the second plate-shaped portion 102 and the movable contact 7 to be reduced compared with the frictional force when the second plate-shaped portion 102 is 100% exposed. A condition in which the arithmetical mean roughness Ra of the surface of the second plate-shaped portion 102 is, for example, 5 μm, the film thickness ranges between 2 μm and 3 μm, inclusive, and the molding surface 32 is formed with a film thickness of 50 nm or smaller allows the ratio of the exposed electroconductive material to be increased from 30% to 80%.

According to the present exemplary embodiment, the ratio of the exposed surface of second plate-shaped portion 102 that the leading edge portion 13 contacts can be 100%. However, it is desirable that the contact and slide between the leading edge portion 13 and the surface where the second plate-shaped portion 102 is 100% exposed be reduced in the Y direction in order to reduce abrasion between the leading edge portion 13 and the second plate-shaped portion 102 due to friction. This configuration ensures a surface of the second plate-shaped portion 102 that the leading edge portion 13 directly comes into with, allowing the electrical continuity to be established with higher certainty.

Figure 16A:
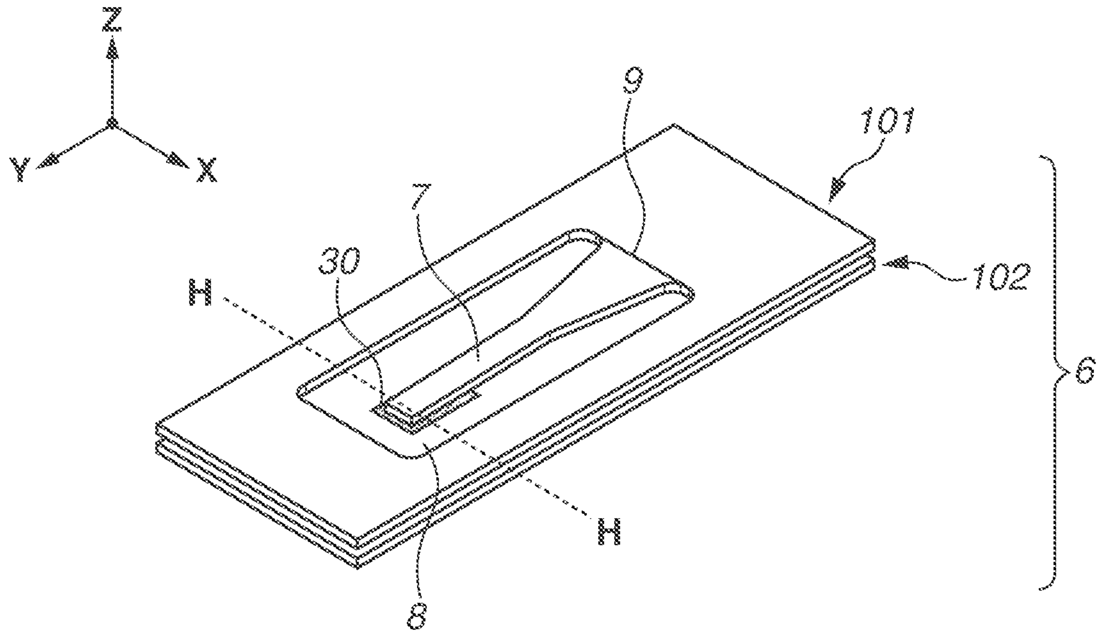
FIGS. 16A and 16B illustrate a structure portion according to a fourth exemplary embodiment.
Figure 16B:
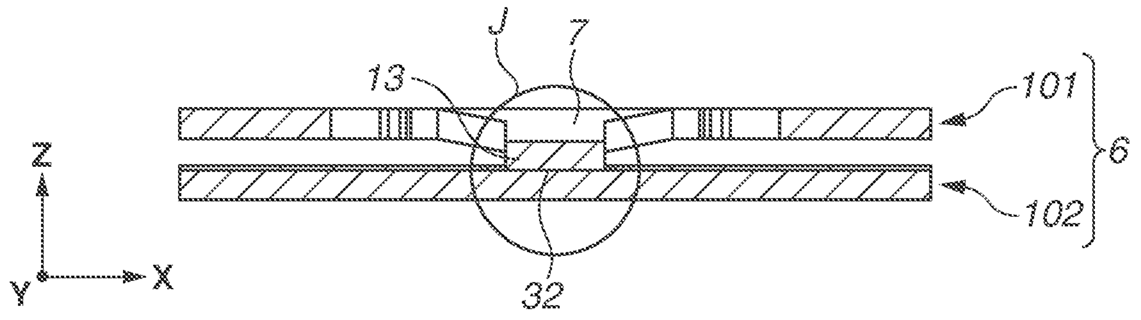
Figure 17:
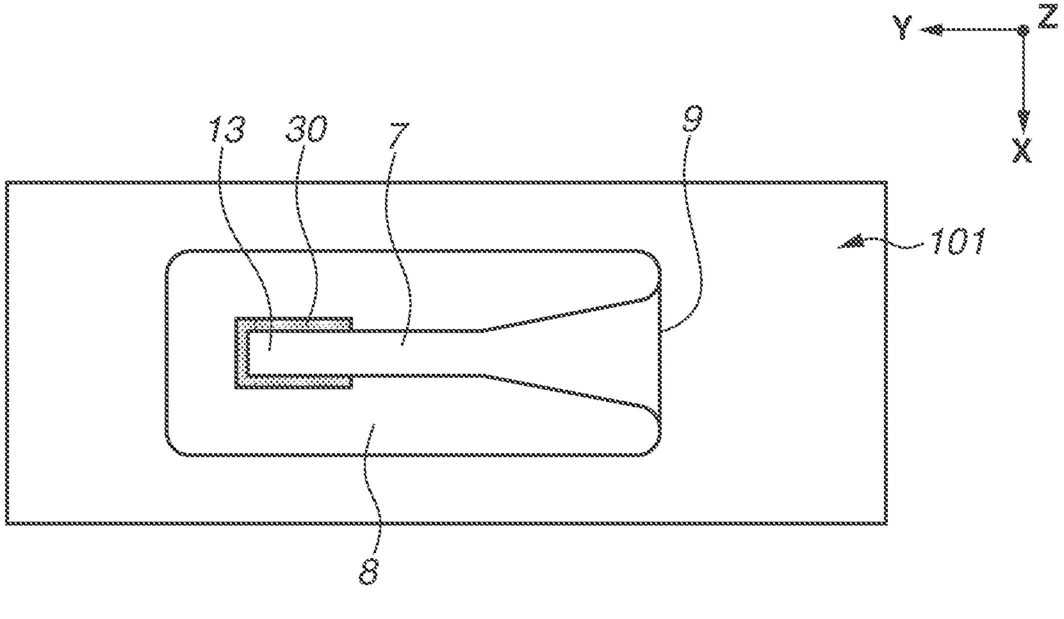
FIG. 17 illustrates a structure portion according to a fifth exemplary embodiment.
Figure 18:
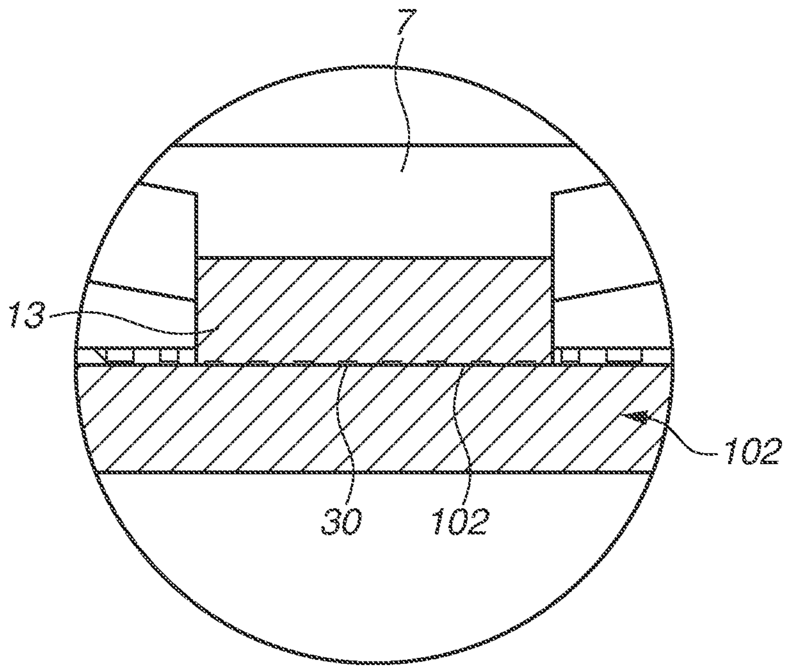
FIG. 18 is an enlarged view of an area surrounded by a circle J in FIG. 16B.

A configuration of a structure portion 6 according to a fifth exemplary embodiment will be described with reference to FIGS. 16A, 16B, and FIG. 17. FIG. 16A is an enlarged view of the structure portion 6 according to the present exemplary embodiment, FIG. 16B is a cross-sectional view taken along an H-H line in FIG. 16A, and FIG. 17 is a top view of FIG. 16A. FIG. 18 is an enlarged view of the area surrounded by a circle J in FIG. 16B.

The fixed contact 8 according to the present exemplary embodiment is different from the first and the second exemplary embodiments in that exposed portions of the second plate-shaped portion 102 and the coated portion 30 are alternately arranged linearly in the direction in which the leading edge portion 13 of the movable contact 7 comes into contact and slides. The leading edge portion 13 can come into contact with the surface of the electroconductive material provided with thinned film arranged thereon in parallel lines.

As illustrated in FIG. 17, the second plate-shaped portion 102 is exposed in a linear way from the connection portion 9 toward the contact of the movable contact 7. Further, the coated portion 30 has a thinner thickness in the direction in which the leading edge portion 13 of the movable contact 7 comes into contact and slides. The widths and intervals of the second exposed plate-shaped portion 102 and the coated portion 30 in the X direction can be varied.

It is desirable to form the width of the connection portion 9 of the movable contact 7 such that the total width of the coated portion 30 is four times or more the total width of the exposed second plate-shaped portion 102. The arrangement in this ratio allows the leading edge portion 13 of the movable contact 7 to avoid coming into contact with the second plate-shaped portion 102 from the moment the leading edge portion 13 starts contacting the coated portion 30, allowing the movable contact 7 to slide with low friction.

Figure 19:
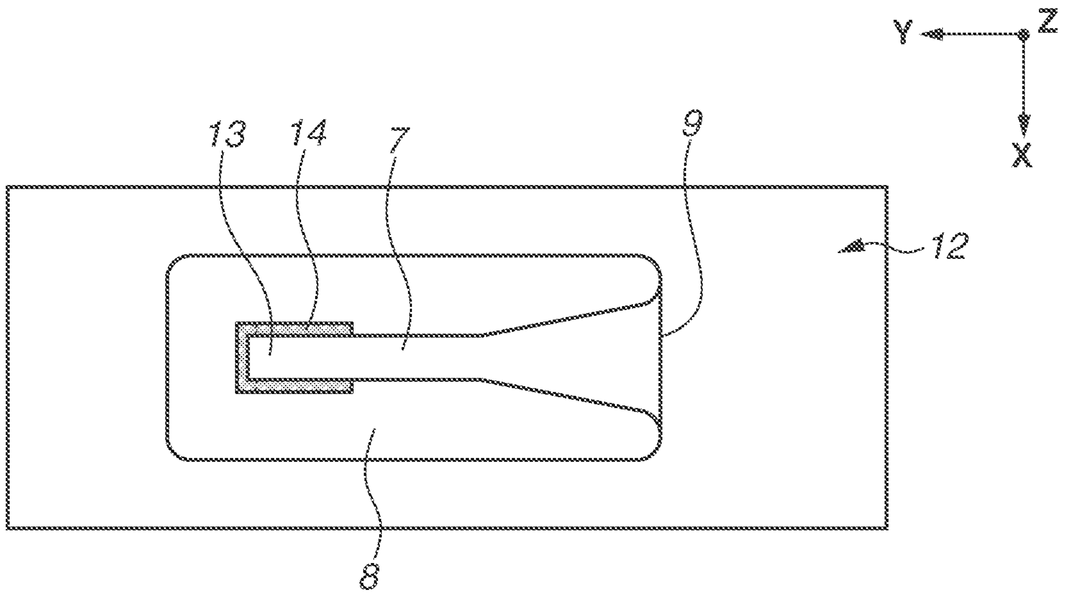
FIG. 19 illustrates a modification of a structure portion according to a sixth exemplary embodiment.

As illustrated in FIGS. 16B and 18, as the leading edge portion 13 of the movable contact 7 comes into contact with and slide on the coated portion 30, a plurality of coated portions 30 arranged linearly is pressed by the contact pressure of the leading edge portion 13, which causes the leading edge portion 13 to come into contact with the exposed surface of the second plate-shaped portion 102. Further, the exposed width of the electroconductive material can increase in the Y direction as illustrated in FIG. 19. In this case, it is desirable that the total width of the exposed second plate-shaped portion 102 without the coated portion 30 closer to the leading edge portion 13 of the movable contact 7 be four times or smaller than the total width of the coated portion 30.

With no exposed second plate-shaped portion 102, the ratio of the exposed second plate-shaped portion 102 to the surface of the coated portion 30 that the leading edge portion 13 comes into contact with can be 80% or smaller. This configuration allows the electrical continuity between the second plate-shaped portion 102 and the movable contact to be easily found.

Suppose, as in the first and the second exemplary embodiments, the leading edge portion 13 is in contact with a surface provided with thin film (the molding surface 32) of the coated portion 30 or a surface in a high exposed ratio of the second plate-shaped portion 102, it could be difficult to obtain to what extent the electrical continuity (resistance value) is established in the contact state of the movable contact 7. Thus, in the present exemplary embodiment, the amount of contact between the coated portion 30 and the surface where a plurality of exposed second plate-shaped portions 102 is arranged in a linear way with respect to the width of the movable contact 7 can be checked in the external appearance, allowing to what extent the electrical continuity is established to be easily found.

Figure 20:
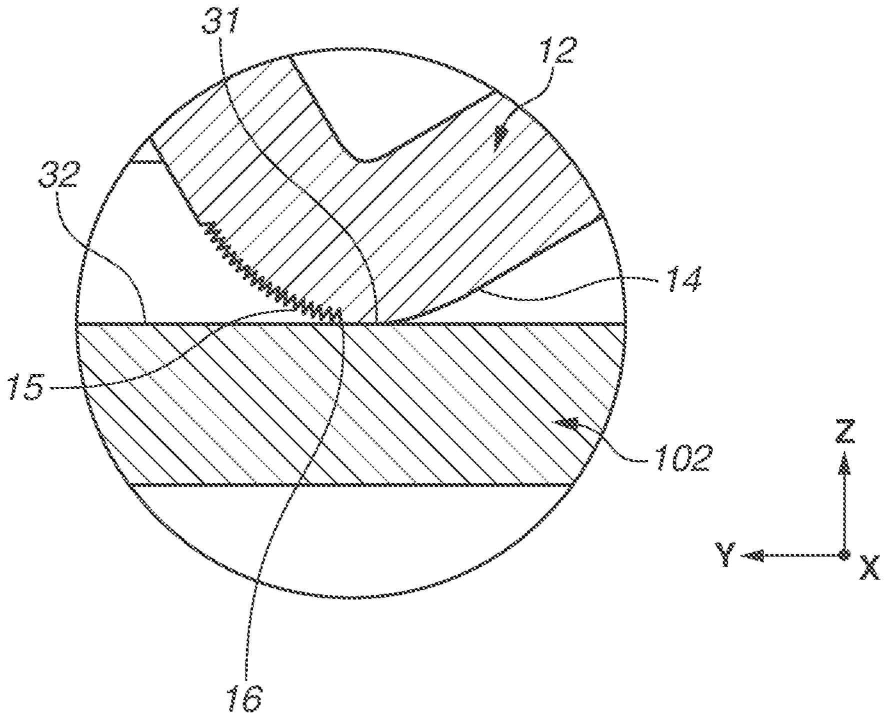
FIG. 20 is an enlarged view of a modification of the area surrounded by the circle C in FIG. 2B.

A structure portion 6 according to a sixth exemplary embodiment will be described with reference to FIG. 20. FIG. 20 is an enlarged view of a modification of the area surrounded by the circle C in FIG. 2B.

The structure portion 6 according to the present exemplary embodiment includes the smooth portion 14 and the asperity portion 15 as in the first exemplary embodiment and includes the molding surfaces 31 and 32 as in the third exemplary embodiment.

According to the present exemplary embodiment, the asperity portion 15 collects a small amount of lubricant applied to the molding surface 32, and the smooth portion 14 comes into contact with the portion from which the lubricant is collected, so that the electrical continuity can be established successfully. The asperity portion 15 does not necessarily have to collect lubricant, and it is sufficient that the asperity portion 15 can remove dust on the molding surfaces 31 and 32.

In this way, any combination of the exemplary embodiments provides the structure portion 6 that facilitates the establishment of the electrical continuity.

Example

The present disclosure will be specifically described in examples. However, the present disclosure is not limited to the examples.

A first example is an example according to the first exemplary embodiment, second and third examples are examples according to the second exemplary embodiment, fourth and fifth examples are examples according to the third exemplary embodiment. As comparative examples, a first comparative example without the molding surface 32 and a second comparative example in which the coated portion 30 is not formed on the second plate-shaped portion 102 were prepared.

The shape of the movable contact 7 was common to the first and the second comparative examples and the first to the fifth examples. The thickness of the first plate-shaped portion 101 was 0.6 mm, the length from the connection portion 9 to the leading edge portion 13 of the movable contact 7 provided with the first plate-shaped portion 101 was 18 mm. The width of the movable contact 7 was 6.6 mm at the connection portion 9 and was narrowed to 2 mm at a position of 7.8 mm toward the leading edge portion 13. The angle between the connection portion 9 and the movable contact 7 before contact was 10 degrees with respect to the surface of the first plate-shaped portion 101, and the contact load with the movable contact 7 and the second plate-shaped portion 102 in contact with each other was given up to 1.5 kgf.

The manufacturing conditions for the examples and the comparative examples other than those described above were as follows.

[Structure]

Sliding distance of the movable contact 7: 3 mm

Material of the movable contact 7: SECC (electrogalvanized steel plate/friction coefficient of 0.5)

Material of the fixed contact 8: SECC (electrogalvanized steel plate/friction coefficient of 0.5)

Material of the coated portion 30: silicon-based organic film (friction coefficient of 0.05)

Thickness of the coated portion 30: approximately 3 μm

Comparative evaluation of frictional forces and resistance values generated with the movable contact 7, the second plate-shaped portion 102, and the coated portion 30 was performed on the examples and the comparative examples. Resistance values were evaluated under the condition that the resistance value with no electrical continuity was 200Ω.

The ratio of the exposed second plate-shaped portion 102 without the coated portion 30 was measured using energy dispersion type X-ray spectroscopy at positions on the coated portion 30.

Table 1 shows the conditions and evaluation results of the examples. The exposed width of the base material is the total width of the exposed plate-shaped portion 102. As for resistance values, maximum values are shown.

comparative example due to the contact of the leading edge portion 13 with the second plate-shaped portion 102 via the molding surface 32.

The second and the third examples also had low frictional forces for the same reason as the first example, and the resistance value was lower than that of the first example due to the contact of the leading edge portion 13 with the second plate-shaped portion 102 exposed from the molding surface 32 at the time of completing contact. When the ratio of the exposed second plate-shaped portion 102 was up to 80%, the frictional force was less than half that of the second comparative example, showing that the resistance value did not become high.

In the fourth and the fifth examples, the leading edge portion 13 slid on the coated portion 30 and came into contact with the second plate-shaped portion 102, so that the frictional forces and the resistance values were similar or equivalent to those in the second and the third examples. From the above-described results, it was confirmed that, in the first to the fifth examples, the slidability was improved by reducing the frictional force between the movable contact 7 and the fixed contact 8 (the second plate-shaped portion 102 and the coated portion 30), and a stable electrical continuity was established successfully.

Figure 21:
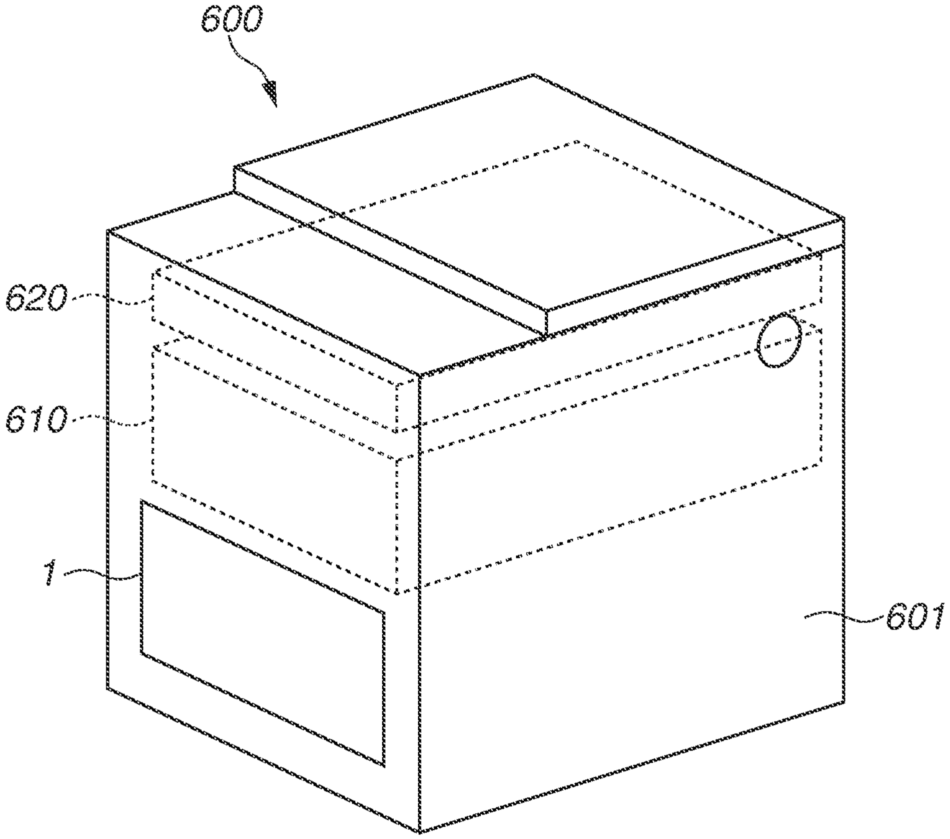
FIG. 21 is a perspective view of an image forming apparatus to which the structure according to any of the exemplary embodiments can be applied.

FIG. 21 illustrate an image forming apparatus 600 as an example of an apparatus to which the housing 1 using the structure portion 6 according to any of the first to the sixth exemplary embodiments can be applied.

TABLE 1

| | | First comparative example | Second comparative example | First example | Second example | Third example | Fourth example | Fifth example |
|---|---|---|---|---|---|---|---|---|
| Thickness of coated portion [μm] | Connection portion side | 3 | 0 | 3 | 3 | 3 | 3 | 3 |
| | Leading edge portion side | 3 | 0 | ≤0.05 | ≤0.05 | ≤0.05 | ≤0.05 | ≤0.05 |
| Base material exposed ratio [%] | Connection portion side | 0 | 100 | 0 | 0 | 0 | 30 | 30 |
| | Leading edge portion side | 0 | 100 | 0 | 60 | 80 | 80 | 77 |
| Base material exposed width [mm] | Connection portion side | — | — | — | — | — | 0.9 | 0.9 |
| | Leading edge portion side | — | — | — | — | — | 0.9 | 2.3 |
| Maximum frictional force (kgf) | | 0.1 | 0.75 | 0.1 | 0.2 | 0.3 | 0.3 | 0.3 |
| Resistance value [Ω] | | ≤200 | ≤20 | ≤10 | ≤5 | ≤5 | ≤5 | ≤5 |

As shown in Table 1, the first to the fifth examples had lower frictional forces and resistance values compared with the first and the second comparative examples.

In the first comparative example, the presence of the coated portion 30 resulted in a low frictional force between the movable contact 7 and the second plate-shaped portion 102 (or the coated portion 30) with the movable contact 7 in contact with the plate-shaped portion 102, but in a high resistance value. In the second comparative example, the resistance value was reduced, but the frictional force in the contact and slide was high. The slidability was reduced, roughening the surfaces of the leading edge portion 13 and the molding surface 32, sometimes making the resistance value unstable.

In the first example, the presence of the coated portion 30 until the movable contact 7 completed contacting the fixed contact 8 resulted in a reduced frictional force in the contact. The resistance value was lower than that of the second The image forming apparatus 600 is, for example, an electrophotographic laser beam printer. The image forming apparatus 600 includes the housing 1, an exterior cover 601, an image forming unit 610, and an image reading unit 620.

The image reading unit 620 is a device that reads an image on a set document. The image forming unit 610 forms images on sheets based on image data. Sheets are recording media that include plain paper, special paper, such as coated paper, an envelope, another type of paper, such as index paper, a plastic film for overhead projectors, and cloth.

Figure 22:
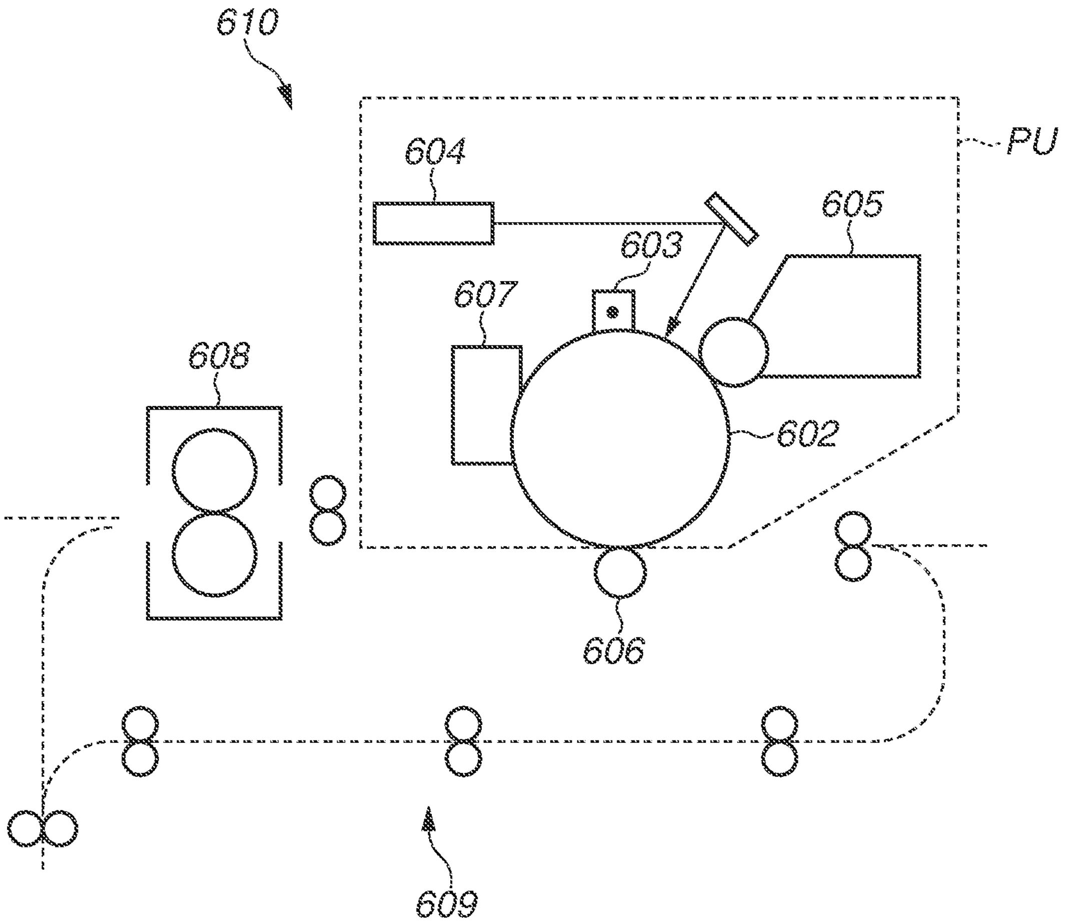
FIG. 22 is a schematic diagram illustrating an image forming unit to be installed in the image forming apparatus.

FIG. 22 is a schematic diagram illustrating the image forming unit 610 illustrated in FIG. 21. The image forming unit 610 is controlled by a control device included in the housing 1. The image forming unit 610 includes an electrophotographic image forming unit PU and a fixing device 608 as illustrated in FIG. 22. With the start of an image forming operation instructed, a photosensitive drum 602, which is a photosensitive member, rotates while the surface of the photosensitive drum 602 is uniformly charged by a charging device 603. Then, an exposure device 604 outputs laser light modulated based on image data transmitted from the image reading unit 620 or an external computer, and scans the surface of the photosensitive drum 602 to form an electrostatic latent image. The electrostatic latent image is developed with toner supplied from a developing device 605, forming a toner image.

In parallel with the above-described image forming operation, a feeding operation is performed in which a sheet in a cassette or a manual feed tray (not illustrated) is fed to the image forming unit 610. The fed sheet is conveyed in harmony with the progress of the image forming operation by the image forming unit PU. Subsequently, the toner image carried on the photosensitive drum 602 is transferred to the sheet by a transfer roller 606.

The toner remaining on the photosensitive drum 602 after the toner image transfer is collected by a cleaning device 607. The sheet to which the toner image is transferred is conveyed to the fixing device 608 in which the sheet is pinched between a pair of rollers and heated and pressurized. In this way, the toner melts and is fixed to the sheet, which is then discharged from the apparatus by a pair of discharging rollers. In a duplex printing, the sheet is inverted by a reversing conveyance unit 609, and is conveyed in the inverted state. An image is then formed on the back surface of the sheet by the image forming unit 610, and then the sheet is discharged from the apparatus. The image forming unit 610 is an example of an image forming unit that can form images on sheets as recording media, and can use a configuration using an intermediate transfer method including an intermediate transfer member instead of the above-described direct transfer method, or use another system, such as an inkjet method.

The above-described exemplary embodiments can be appropriately modified within the range not departing from the technical idea. For example, according to the above-described exemplary embodiments, the container forming the housing includes a first plate-shaped portion, and the lid includes a second plate-shaped portion, but each of them can include the opposite plate-shaped portion. Further, according to the above-described exemplary embodiments, the examples of the housing that establishes the electrical continuity between the container and the lid have been described. However, the present disclosure can be applied to any structure that establishes the electrical continuity between members each having a plate-shaped portion that is overlapped with the other.

A configuration with any combination of the exemplary embodiments described above can be also used. In addition, a part of at least one exemplary embodiment can be deleted or replaced. Further, a new part can be added to at least one exemplary embodiment.

The disclosure of the present specification includes not only what is explicitly described in the present specification, but also all the matter that can be understood from the present specification and the drawings attached thereto.

Further, the disclosure of the present specification includes the complement of the individual concepts described in the present specification. More specifically, if the present specification includes a description to the effect that, for example, "A is greater than B," even if the description omits a description to the effect that "A is not greater than B", it can be said that the present specification still discloses that "A is not greater than B". This is because the description that "A is greater than B" assumes the case of "A is not greater than B".

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2023-072531, filed Apr. 26, 2023, No. 2023-166366, filed Sep. 27, 2023, and No. 2023-172593, filed Oct. 4, 2023, which are hereby incorporated by reference herein in their entirety.

What is claimed is:

1. An electrical component box comprising:
a housing; and
a control unit provided in the housing and configured to control an electronic device outside the housing,
wherein the housing includes:
a container configured to include one of a first plate-shaped portion and a second plate-shaped portion; and
a lid configured to include the other of the first plate-shaped portion and the second plate-shaped portion and to cover an opening of the container,
wherein the housing has a structure comprising:
the first plate-shaped portion having electric conductivity; and
the second plate-shaped portion having electric conductivity,
wherein the first plate-shaped portion includes an elastic member provided with a bending portion configured to protrude toward the second plate-shaped portion and come into contact with the second plate-shaped portion to establish electrical continuity between the first plate-shaped portion and the second plate-shaped portion, and
wherein a surface of the bending portion facing the second plate-shaped portion includes a smooth portion and an asperity portion having a roughness that is greater than a roughness of the smooth portion.

2. The electrical component box according to claim 1, wherein the elastic member is provided to extend from a connection portion of the first plate-shaped portion, and the asperity portion is provided closer to a leading edge of the elastic member than the smooth portion.

3. The electrical component box according to claim 1, wherein the smooth portion of the first plate-shaped portion is configured to come into contact with the second plate-shaped portion.

4. The electrical component box according to claim 1,
wherein the asperity portion and the smooth portion of the bending portion are provided in a row, and
wherein the bending portion is provided so that, when the bending portion is brought into contact with the second plate-shaped portion, the asperity portion moves in contact with the second plate-shaped portion, and then the smooth portion comes into contact with the second plate-shaped portion.

5. The electrical component box according to claim 1, wherein the bending portion is a first bending portion, the elastic member includes a second bending portion that is between a connection portion of the first plate-shaped portion and the first bending portion, and an angle of the second bending portion facing the second plate-shaped portion is an obtuse angle.

6. The electrical component box according to claim 1, wherein the bending portion has a curvature.

7. The electrical component box according to claim 6, wherein a radius of curvature of the bending portion ranges between 0.3 millimeter (mm) and 1.0 mm, inclusive.

8. The electrical component box according to claim 1, wherein an arithmetical mean roughness Ra of the asperity portion ranges between 10 micrometers (μm) and 20 μm, inclusive.

9. The electrical component box according to claim 1, wherein an arithmetical mean roughness Ra of the smooth portion ranges between 0.3 micrometers (μm) and 0.9 μm, inclusive.

10. The electrical component box according to claim 1, wherein the asperity portion includes a first asperity portion and a second asperity portion that is different in an arithmetical mean roughness Ra from an arithmetical mean roughness Ra of the first asperity portion.

11. The electrical component box according to claim 10, wherein the arithmetical mean roughness Ra of the first asperity portion is greater than the arithmetical mean roughness Ra of the second asperity portion, and the first asperity portion is provided closer to a leading edge of the elastic member than the second asperity portion.

12. The electrical component box according to claim 10, wherein the arithmetical mean roughness Ra of the first asperity portion ranges between 15 micrometers (μm) and 25 μm, inclusive, and the arithmetical mean roughness Ra of the second asperity portion ranges between 0.5 μm and 1.5 μm, inclusive.

13. The electrical component box according to claim 1, wherein a first surface of the second plate-shaped portion configured to come into contact with the first plate-shaped portion includes a coated portion that is coated with a material having a friction coefficient that is lower than a friction coefficient of a second surface of the second plate-shaped portion, wherein the first plate-shaped portion includes the elastic member configured to come into contact with the second plate-shaped portion to establish electrical continuity between the first plate-shaped portion and the second plate-shaped portion, and wherein the coated portion of the second plate-shaped portion includes a first molding surface and a second molding surface, where material of the second molding surface has a thickness that is smaller than a thickness of the first molding surface.

14. The electrical component box according to claim 13, wherein the first molding surface is provided in an extending direction of the elastic member with respect to the second molding surface.

15. The electrical component box according to claim 13, wherein the second plate-shaped portion is exposed more on the second molding surface than on the first molding surface.

16. An image forming apparatus comprising:

an image forming unit configured to form an image on a sheet, wherein the image forming unit is controlled by a control device provided in a housing, wherein the housing includes:

a container configured to include one of a first plate-shaped portion and a second plate-shaped portion, and a lid configured to include the other of the first plate-shaped portion and the second plate-shaped portion and to cover an opening of the container, wherein the housing has a structure comprising:

the first plate-shaped portion having electric conductivity; and the second plate-shaped portion having electric conductivity, wherein the first plate-shaped portion includes an elastic member provided with a bending portion configured to protrude toward the second plate-shaped portion and come into contact with the second plate-shaped portion to establish electrical continuity between the first plate-shaped portion and the second plate-shaped portion, and wherein a surface of the bending portion facing the second plate-shaped portion includes a smooth portion and an asperity portion having a roughness that is greater than a roughness of the smooth portion.

17. The image forming apparatus according to claim 16, wherein the elastic member is provided to extend from a connection portion of the first plate-shaped portion, and the asperity portion is provided closer to a leading edge of the elastic member than the smooth portion.

18. The image forming apparatus according to claim 16, wherein the smooth portion of the first plate-shaped portion is configured to come into contact with the second plate-shaped portion.

19. The image forming apparatus according to claim 16, wherein the asperity portion and the smooth portion of the bending portion are provided in a row, and wherein the bending portion is provided so that, when the bending portion is brought into contact with the second plate-shaped portion, the asperity portion moves in contact with the second plate-shaped portion, and then the smooth portion comes into contact with the second plate-shaped portion.

20. The image forming apparatus according to claim 16, wherein the bending portion is a first bending portion, the elastic member includes a second bending portion that is between a connection portion of the first plate-shaped portion and the first bending portion, and an angle of the second bending portion facing the second plate-shaped portion is an obtuse angle.

21. The image forming apparatus according to claim 16, wherein the asperity portion includes a first asperity portion and a second asperity portion that is different in an arithmetical mean roughness Ra from an arithmetical mean roughness Ra of the first asperity portion.

22. The image forming apparatus according to claim 16, wherein a first surface of the second plate-shaped portion configured to come into contact with the first plate-shaped portion includes a coated portion that is coated with a material having a friction coefficient that is lower than a friction coefficient of a second surface of the second plate-shaped portion, wherein the first plate-shaped portion includes the elastic member configured to come into contact with the second plate-shaped portion to establish electrical continuity between the first plate-shaped portion and the second plate-shaped portion, and wherein the coated portion of the second plate-shaped portion includes a first molding surface and a second molding surface, where material of the second molding surface has a thickness that is smaller than a thickness of the first molding surface.

* * * * *